(12) United States Patent
Nakamura et al.

(10) Patent No.: US 10,197,160 B2
(45) Date of Patent: Feb. 5, 2019

(54) OIL RING

(71) Applicant: KABUSHIKI KAISHA RIKEN, Chiyoda-ku, Tokyo (JP)

(72) Inventors: Daisuke Nakamura, Tokyo (JP); Kazuyuki Yamahata, Tokyo (JP); Mitsuhiro Adachi, Tokyo (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 0 days.

(21) Appl. No.: 15/534,119

(22) PCT Filed: Dec. 1, 2015

(86) PCT No.: PCT/JP2015/005972
§ 371 (c)(1),
(2) Date: Jun. 8, 2017

(87) PCT Pub. No.: WO2016/092776
PCT Pub. Date: Jun. 16, 2016

(65) Prior Publication Data
US 2018/0023702 A1    Jan. 25, 2018

(30) Foreign Application Priority Data

Dec. 11, 2014 (JP) .................. 2014-251015

(51) Int. Cl.
*F16J 9/12* (2006.01)
*F16J 9/06* (2006.01)
(Continued)

(52) U.S. Cl.
CPC ............... *F16J 9/06* (2013.01); *F02F 5/00* (2013.01); *F16J 9/062* (2013.01); *F16J 9/20* (2013.01)

(58) Field of Classification Search
CPC .................. F16J 9/06; F16J 9/20; F02F 5/00
See application file for complete search history.

(56) References Cited

U.S. PATENT DOCUMENTS 8,371,585 B2 *   2/2013   Esser et al. ................ F16J 9/20
9,851,006 B2 *  12/2017   Watanabe .................. F16J 9/20
2002/0190476 A1  12/2002   Preyer et al.

FOREIGN PATENT DOCUMENTS

CN    102575767 A    7/2012
CN    104061087 A    9/2014
(Continued)

OTHER PUBLICATIONS

Jun. 13, 2017, International Preliminary Report on Patentability issued in the International Patent Application No. PCT/JP2015/005972.
(Continued)

*Primary Examiner* — Gilbert Y Lee
(74) *Attorney, Agent, or Firm* — Kenja IP Law PC

(57) ABSTRACT

An oil ring (1) includes an oil ring body (10) and a coil expander (20). The oil ring body (10) includes a pair of rail portions (12) each including an end portion of an outer periphery having a land (30) formed protruding radially outward from each rail portion (12). The land (30) includes an upper axial portion (31) and a lower axial portion (32) facing opposite to each other in an axial direction, a tapered portion (33) having one axial end contiguous to the upper axial portion (31) via a first curved portion (35), and a protruding portion (34) having one of axial ends contiguous to the tapered portion (33) and the other axial end contiguous to the lower axial portion (32) via a second curved portion (36). The protruding portion (34) is protruding in a direction perpendicular to the tapered portion (33).

7 Claims, 4 Drawing Sheets

(51) Int. Cl.
*F02F 5/00* (2006.01)
*F16J 9/20* (2006.01)

(56) References Cited

FOREIGN PATENT DOCUMENTS

| | | |
|---|---|---|
| JP | H0495169 U | 8/1992 |
| JP | H09144881 A | 6/1997 |
| JP | H09196172 A | 7/1997 |
| JP | 2003520931 A | 7/2003 |
| JP | 2010530045 A | 9/2010 |
| JP | 2014035038 A | 2/2014 |
| WO | 2011152114 A1 | 12/2011 |
| WO | 2013178204 A1 | 12/2013 |

OTHER PUBLICATIONS

Jan. 4, 2018, Office Action issued by the State Intellectual Property Office in the corresponding Chinese Patent Application No. 201580067082.4.
Feb. 2, 2016, International Search Report issued in the International Patent Application No. PCT/JP2015/005972.
Jul. 11, 2018, Extended European Search Report issued by the European Patent Office in the corresponding European Patent Application No. 15868367.2.
Jul. 3, 2018, Notification of Reasons for Refusal issued by the Japan Patent Office in the corresponding Japanese Patent Application No. 2014-251015.
Sep. 30, 2018, Office Action issued by the State Intellectual Property Office in the corresponding Chinese Patent Application No. 201580067082.4.

\* cited by examiner

OIL RING

TECHNICAL FIELD

This disclosure relates to an oil ring used for a piston of a reciprocating engine (a reciprocating internal combustion engine), and more specifically, to a two-piece type oil ring that includes an oil ring body formed in a split ring shape with an opening and a coil expander mounted on a radially inner side of the oil ring body.

BACKGROUND

Conventionally, a piston of a reciprocating engine is provided with, in addition to a compression ring for keeping combustion gas out, an oil ring for keeping lubricating oil out.

The oil ring is classified into a three-piece type used mainly in a gasoline engine and a two-piece type used mainly in a diesel engine. To meet a demand for low fuel consumption, however, the two-piece type oil ring, which may have a smaller width in an axial direction, has been increasingly used in the gasoline engine.

As the two-piece oil ring, there is known an oil ring including two components: an oil ring body having a web portion provided with an oil passage hole and a pair of rail portions integrally formed with the web portion at axial ends (a top and a bottom) of the web portion; and a coil expander mounted on a radially inner side of the oil ring body to push the oil ring body radially outward. In this case, the oil ring body is formed in a split ring shape with an opening so as to be able to extend (to increase a diameter of the oil ring body) when pushed radially outward by the coil expander. When pushed by the coil expander, the oil ring body extends in such a manner that a slide-contact surface of each of the rail portions facing radially outward contacts with an inner surface of a cylinder and applies a certain contact pressure (a surface pressure) to the inner surface. At this time, the slide-contact surface, in accordance with reciprocation of the piston, applies the oil retained between the pair of rail portions to the inner surface of the cylinder while the rail portion scrapes off excess oil and sends the excess oil back to a crank chamber via the oil passage hole. Thereby, an oil film with an appropriate thickness is formed on the inner surface of the cylinder.

In recent years, following an improvement in functionality of an internal combustion engine to meet a market demand for the low fuel consumption and low oil consumption, there has been a demand for an oil ring capable of reducing friction against the inner surface of the cylinder as well as the oil consumption by controlling an oil scraping-up action during piston upstroke and amplifying an oil scraping-off action. In an effort to meet such a demand, there are proposed oil rings having peripheral surfaces in various shapes facing radially outward.

For example, PLT 1 set forth below describes an oil ring having, on respective peripheral portions of an upper rail portion and an lower rail portion close to the combustion chamber, tapered portions gradually decreasing in diameter toward the combustion chamber.

CITATION LIST

Patent Literature

PLT 1: JP-A-09-144881

SUMMARY

Technical Problem

In the oil ring of the PLT 1 described above, however, a slide-contact surface of each rail portion to contact with the inner surface of the cylinder is small in size and thus applies a high surface pressure to the inner surface of the cylinder. Although this configuration reduces the oil climbing up into the combustion chamber and also reduces the oil consumption, the slide-contact surface wears quickly due to the high surface pressure and, after being used for a long period of time, reduces an oil scraping effect and increases the oil consumption. Further, when the slide-contact surface of each rail portion to contact with the inner surface of the cylinder is small, a surface pressure generated on the slide-contact surface increases, escalating friction against the inner surface of the cylinder. Consequently, the fuel consumption of the engine using this oil ring deteriorates.

Therefore, it could be helpful to provide an oil ring capable of reducing the oil consumption as well as the fuel consumption of the engine for a long period of time.

Solution to Problem

An oil ring includes an oil ring body, which is formed in a split ring shape having an opening, a web portion, and a pair of rail portions integrally formed with either axial end of the web portion, and also includes a coil expander, which is mounted on a radially inner side of the oil ring body to push the oil ring body radially outward. The rail portions each have, at respective end portions of outer peripheries thereof, a land formed protruding radially outward from the pair of rail portions. The land includes a pair of axial portions facing opposite to each other in an axial direction, a tapered portion having one axial end contiguous to one of the axial portions via a first curved portion, and a protruding portion that has one of axial ends contiguous to the tapered portion and the other axial end contiguous to the other axial portion via a second curved portion and protrudes from the tapered portion in a direction perpendicular to the tapered portion.

In the above configuration, the "split ring shape with an opening" refers to the oil ring body formed in a C-shape having a cut-out. Also, the "axial direction" refers to a direction along an axis of the oil ring body in the split ring shape.

Preferably, in the above configuration a peripheral surface of the protruding portion is formed in a semi-barrel shape.

Preferably, in the above configuration a peripheral surface of the protruding portion is formed in a cylindrical shape in parallel with the axial direction.

Preferably, in the above configuration a radial direction height of the protruding portion from a connection portion between the protruding portion and the tapered portion is at least 0.018 mm.

Preferably, in the above configuration the tapered portion has a conical surface inclined at an angle of 55 degrees or less with respect to the axial direction.

Preferably, in the above configuration both a radius of the first curved portion and a radius of a second curved portion are 0.12 mm or less.

Preferably, in the above configuration an axial length of the tapered portion is at least 0.05 mm.

Advantageous Effect

According to the disclosure herein, having the protruding portion being pushed against the inner surface of the cylinder and applying a high surface pressure, the oil ring of the disclosure may prevent oil from climbing up into a combustion chamber and reduce oil consumption of an engine using the oil ring. Also, the tapered portion generates a wedge effect between the tapered portion and the inner surface of the cylinder and facilitates supply of the oil between the protruding portion and the inner surface of the cylinder. Thus, wear of the protruding portion may be prevented for a long period of time, and friction against the inner surface of the cylinder caused by the protruding portion may be reduced. Consequently, an oil ring of the disclosure is capable of reducing the oil consumption as well as fuel consumption of the engine for a long period of time.

DETAILED DESCRIPTION

Hereinafter, one embodiment of the disclosure will be described in detail with reference to the accompanying drawings.

Figure 1:
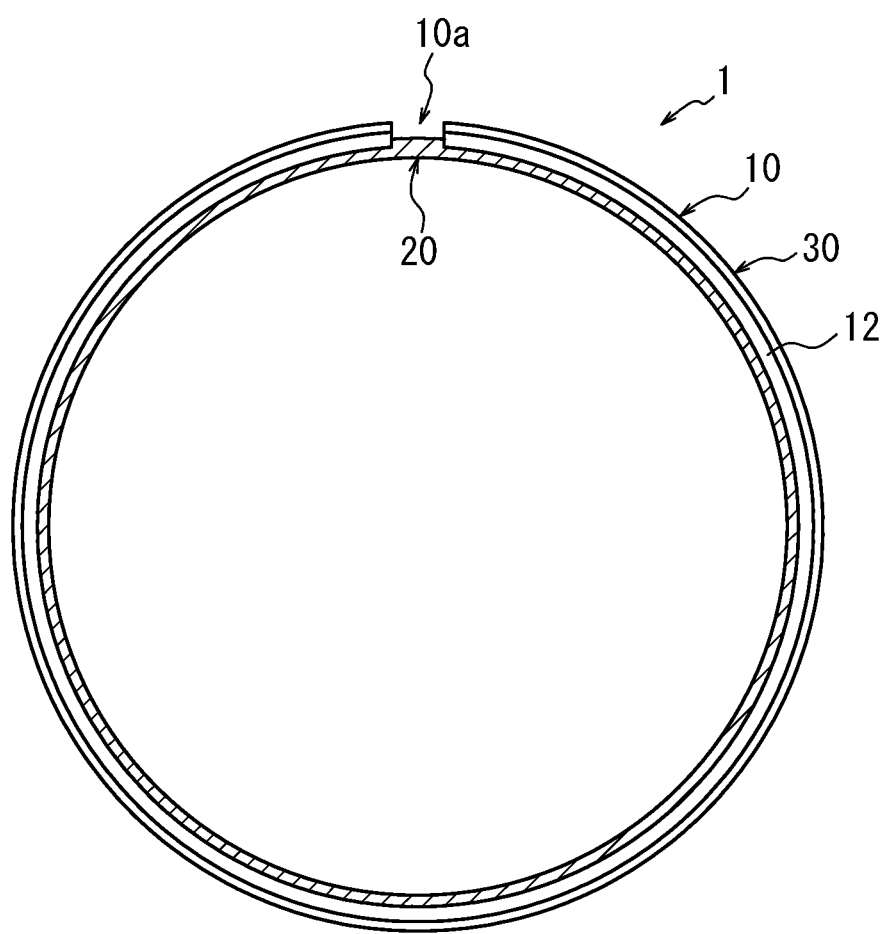
FIG. 1 is a plan view of an oil ring according to one embodiment.

An oil ring 1 according to the one embodiment of the disclosure as illustrated in FIG. 1 is also referred to as an oil control ring and mounted on a ring groove formed on a peripheral surface of a piston of, for example, a diesel engine. The oil ring 1 is of a two-piece type and includes an oil ring body 10 and a coil expander 20.

As illustrated in FIG. 1, the oil ring body 10 is formed in a split ring shape with opening 10a. That is, the oil ring body 10 has a C-shape with the opening 10a formed as a cut-out at the periphery the oil ring body 10. The oil ring body 10 may be formed of, for example, steel. Having the opening 10a, the oil ring body 10 may be elastically deformed in a manner extending (expanding) radially outward to extend the opening 10a in a circumferential direction of the oil ring body 10. Also, the oil ring body 10, when mounted on the piston and disposed in a cylinder, forms a substantially annular shape closing the opening 10a to seal off the entire peripheral surface of the piston from oil.

Figure 2:
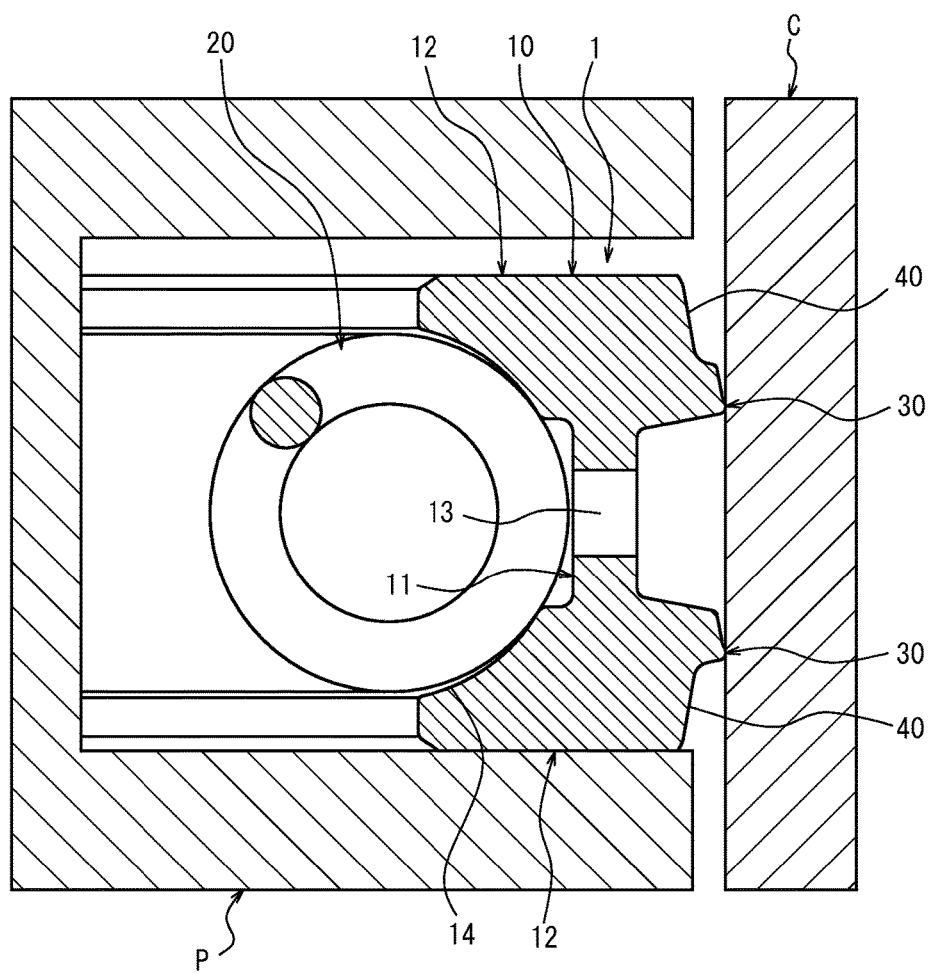
FIG. 2 is a longitudinal cross-sectional view of the oil ring illustrated in FIG. 1 in use.

As illustrated in FIG. 2, the oil ring body 10 includes a web portion 11 and a pair of rail portions 12, which are together forming a substantial M-shape in cross-section.

The web portion 11 is formed in a thin cylindrical shape. At a center of the web portion 11 in an axial direction thereof, a plurality of oil passage holes 13 penetrating the web portion 11 in a radial direction of the web portion 11 are formed at intervals in a circumferential direction of the web portion 11. The oil passage holes 13 may be, for example, long holes or circular holes.

One of the pair of rail portions 12 is integrally formed with one of axial sides of the web portion 11, and the other rail portion 12 is integrally formed with the other axial side of the web portion 11. The rail portions 12 each have a radial thickness larger than that of the web portion 11. The web portion 11 is contiguous to the rail portions 12 at radially center portions of the rail portions 12.

A radially internal portion (an inner surface) of the oil ring body 10 is provided with a mounting groove 14 on which the coil expander 20 is mounted. The mounting groove 14 is in the shape of a semi-circular recess in cross-section formed from the web portion 11 to both of the rail portions 12 and extends throughout the entire periphery of the oil ring body 10 along a circumferential direction of the oil ring body 10.

Although simplified in FIG. 1, the coil expander 20 is configured with a wire formed of steel or the like wound into a coil shape with both ends connected to each other to form an annular shape. The coil expander 20 may be elastically deformed in any manner in radially inward and outward directions and has an outer diameter in its natural state greater than an inner diameter of the oil ring body 10. As illustrated in FIG. 2, the coil expander 20 in a state elastically deformed in a radially-shrinking direction is mounted on the mounting groove 14 formed on the oil ring body 10 and pushes the oil ring body 10 radially outward.

A radius of the coil expander 20 as viewed from a direction perpendicular to a circumferential direction thereof is slightly smaller than a radius of the mounting groove 14 formed on the oil ring body 10.

A land 30 is formed at an end portion of an outer periphery of each of the rail portions 12. The end portion is facing outward of a radial direction of the rail portions 12. The land 30 is protruding radially outward from each of the end portions of the outer peripheries of the rail portions 12, forming an annular shape extending throughout a periphery of the rail portion 12.

Figure 3:
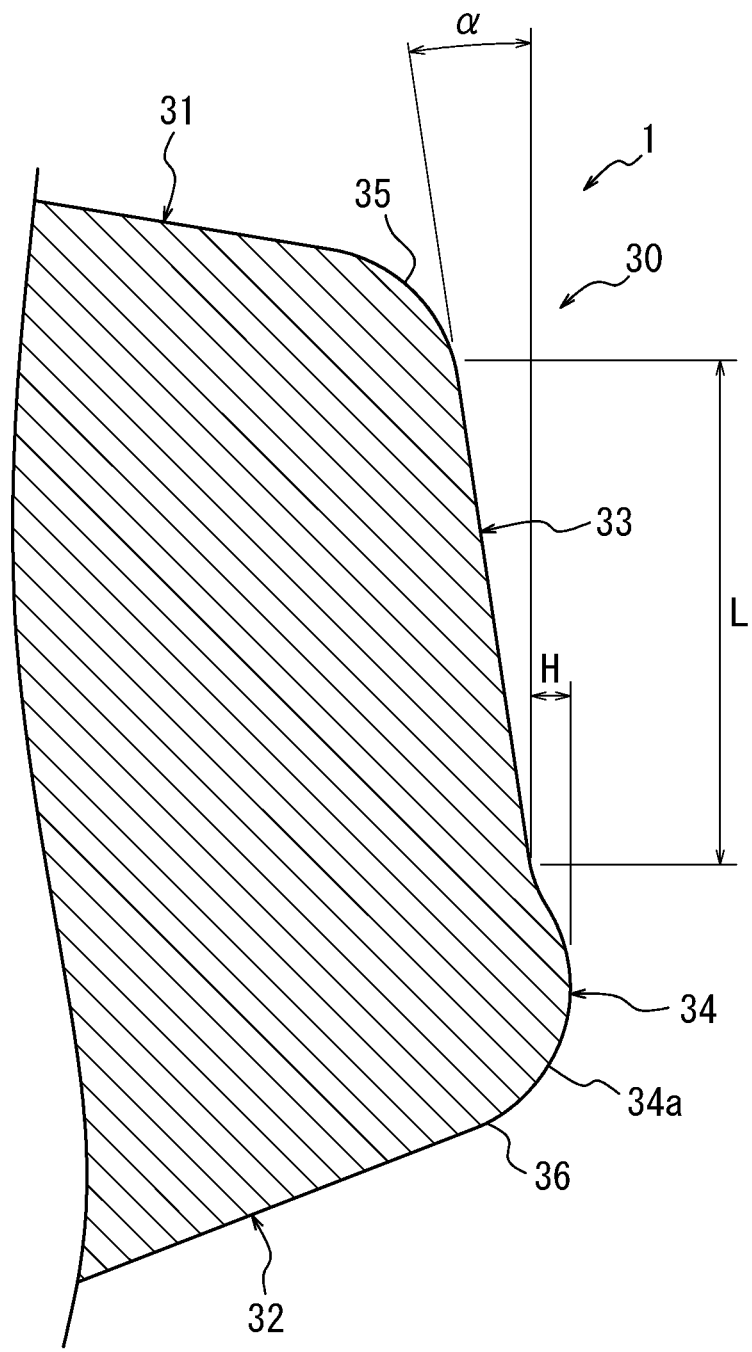
FIG. 3 is an enlarged cross-sectional view of a land of the oil ring illustrated in FIG. 1.

Referring now to FIG. 3, the land 30 will be described in detail. Since the land 30 provided on the rail portion 12 on an upper side and the land 30 provided on the rail portion 12 on a lower side have substantially the same shape, the land 30 provided on the rail portion 12 on the upper side will be described below.

The land 30 includes an upper axial portion 31 facing one side of an axial direction (close to the combustion chamber) of the land 30 and a lower axial portion 32 facing the other side (close to a crank chamber) of the axial direction. The land 30 also includes a tapered portion 33 and a protruding portion 34 between the upper axial portion 31 and the lower axial portion 32.

The tapered portion 33 has a tapered shape with a diameter gradually increasing from one axial end thereof (on an upper side in FIG. 3), which is positioned close to the combustion chamber when the oil ring 1 is mounted on the piston P, toward the other axial end (on a lower side in FIG. 3). When the piston P moves upward in FIG. 2 during a compression process and an exhaust process, the tapered portion 33 generates a wedge effect between the tapered portion 33 and the inner surface of a cylinder C. This wedge effect yields an effect to facilitate the supply of the oil between the protruding portion 34 and the inner surface of the cylinder C and thus effectively prevents the wear of the protruding portion 34.

As illustrated in FIG. 3, for example, the tapered portion 33 may be formed in a conical shape with a diameter gradually increasing from one of the axial ends of the tapered portion 33 to the other. In this case, an angle α of the tapered portion 33 with respect to the axial direction is preferably greater than 0 degree and no more than 55 degrees. The angle α within this range yields an effect to allow effective generation of the wedge effect between the protruding portion 34 and the inner surface of the cylinder C to effectively supply the oil therebetween.

Note that the tapered portion 33 is not limited to the conical shape but may have various shapes including, for example, a tapered shape curved in a concave or convex manner.

An axial length L of the tapered portion 33 is preferably at least 0.05 mm. Such an axial length may enable the effective generation of the wedge effect between the protruding portion 34 and the inner surface of the cylinder C to effectively supply the oil therebetween.

One of axial ends of the tapered portion 33 is contiguous to the upper axial portion 31 via a first curved portion 35. On the other hand, the other axial end of the tapered portion 33 is contiguous to one of axial ends of the protruding portion 34, and the other axial end of the protruding portion 34 is contiguous to the lower axial portion 32 via a second curved portion 36.

The first curved portion 35 is formed in a curved surface smoothly connecting between the upper axial portion 31 and the tapered portion 33, and the second bending portion 36 is formed in a curved surface smoothly connecting between the lower axial portion 32 and the protruding portion 34. The first and second curved portions 35 and 36 may have arcuate peripheries when viewed in cross-section perpendicular to a circumferential direction of the first and second curved portions 35 and 36. In this case, preferably, the first and second curved portions 35 and 36 each have a radius R of 0.12 mm or less.

A peripheral surface 34a of the protruding portion 34, as illustrated in FIG. 3, for example, may have a semi-barrel shape. That is, the protruding portion 34 may have a semicircular shape in cross-section perpendicular to a circumferential direction thereof, forming an annular shape extending throughout the periphery of the rail portion 12.

The protruding portion 34 is protruding from the tapered portion 33 in a direction perpendicular thereto, in such a manner that the land 30, at the protruding portion 34, contacts with and slide on the inner surface of the cylinder C. Note that, in some operation state of the oil ring 1, the tapered portion 33 in addition to the protruding portion 34 may contact with and slide on the inner surface of the cylinder C.

As described above, the land 30, on an outer periphery thereof, includes the tapered portion 33 and the protruding portion 34 that contacts with and slides on the inner surface of the cylinder C. Thus, the protruding portion 34 may contacts with the inner surface of the cylinder C applying a high surface pressure thereto. Consequently, the protruding portion 34 may reliably scrape off the oil adhering to the inner surface of the cylinder C, preventing the oil in the engine using the oil ring 1 from climbing up into the combustion chamber. That is, the protruding portion 34 may reduce the oil consumption.

As described above, further, because of the protruding portion 34 adjacent to the tapered portion 33 for generating the wedge effect between the tapered portion 33 and the inner surface of the cylinder C, the oil is effectively supplied between the protruding portion 34 and the inner surface of the cylinder C. Thus, when the protruding portion 34 contacts with the inner surface of the cylinder C applying a high surface pressure thereto, the oil is sufficiently provided and effectively prevent the wear of the protruding portion 34. Consequently, the oil consumption as well as the fuel consumption of the engine is reduced for a long period of time.

A radial direction height H of the protruding portion 34 from a connection portion between the protruding portion 34 and the tapered portion 33 is preferably at least 0.018 mm to yield an effect to prevent the wear of the protruding portion 34 for a long period of time while reducing the oil consumption as well as the fuel consumption for a long period of time.

Figure 4:
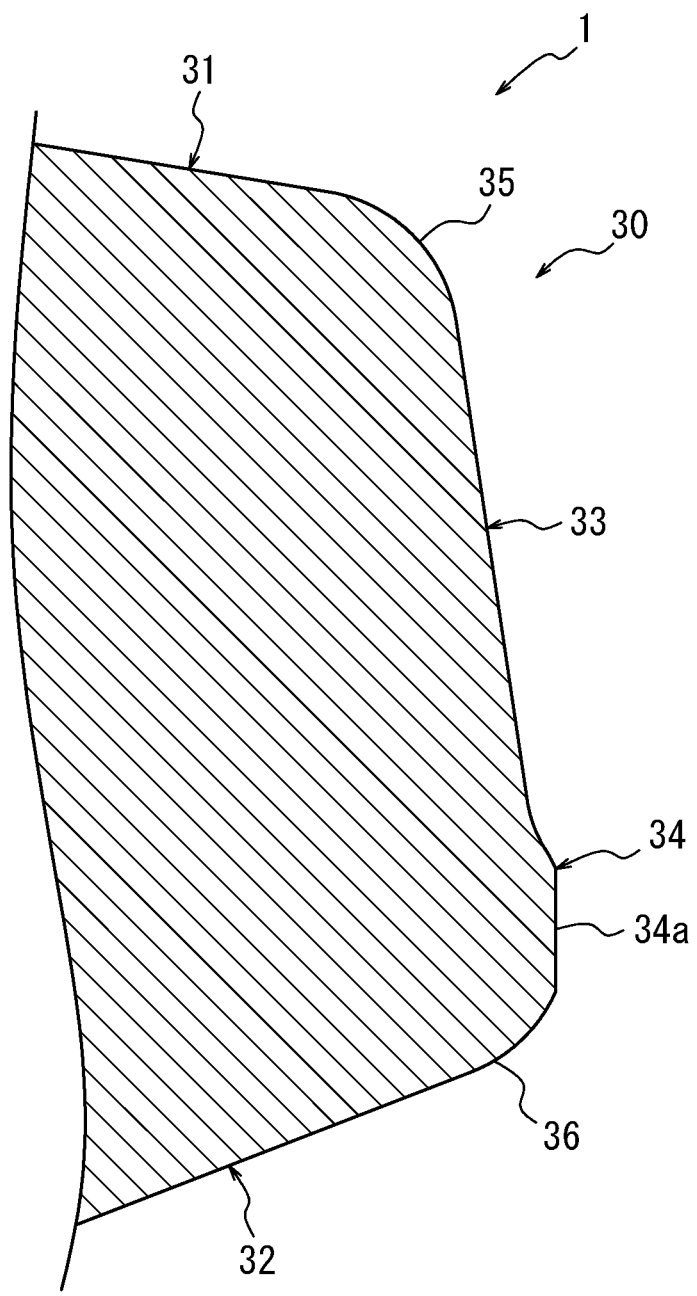
FIG. 4 is an enlarged cross-sectional view of a variation of the land illustrated in FIG. 3.

The protruding portion 34 is not limited to the half-barrel shape as illustrated in FIG. 3 but may have, as illustrated in FIG. 4, for example, the peripheral surface 34a in a cylindrical shape parallel to the axial direction. The protruding portion 34 in this shape is more wear resistant and may reduce the oil consumption as well as the fuel consumption for a longer period of time.

As illustrated in FIG. 2, a tapered surface 40 is formed in respective peripheral portions of the rail portions 12 where the lands 30 are not formed. The tapered surface 40 has a diameter gradually increasing from an axial surface of the rail portion 12, which is facing in an axial direction of the rail portion 12, to the land 30. The tapered surface 40 generates the wedge effect between the tapered surface 40 and the inner surface of the cylinder C. Thus, the oil may be more effectively supplied to the land 30.

A hard layer (a hard anodic oxide coating) may be formed on a surface of the land 30 of the oil ring body 10. The hard layer may contain at least one layer selected from the group consisting of, for example, a nitrided layer, a PVD-processed layer, a hard-chromium plated layer, and a DLC layer. The hard layer may prevent the protruding portion 34 from being worn off for a long period of time, and the oil consumption as well as the fuel consumption of the engine is reduced for a long period of time.

Note that the "PVD treated layer" refers to "a layer formed by physical vapor deposition (Physical Vapor Deposition)", and the "DLC (Diamond Like Carbon) layer" refers to a noncrystalline hard carbon film mainly composed of hydrocarbon or carbon allotrope.

EXAMPLES

To confirm effects of the disclosure herein, oil rings of Examples 1 and 2 and an oil ring of Comparative Example were prepared and subjected to friction loss measurement and oil consumption measurement. Results of the measurement were compared with each other.

For the oil ring of Example 1 in the shape as illustrated in FIGS. 1 to 3, the radius R of the first curved portion was 0.06 mm, the angle α of the tapered portion with respect to the axial direction was at 2 degrees, the axial length L of the tapered portion was 0.05 mm, the radial direction height H of the protruding portion was 0.018 mm, and the radius R of the second curved portion was 0.06 mm.

For the oil ring of Example 2 in the shape as illustrated in FIGS. 1 to 3, the radius R of the first curved portion was 0.12 mm, the angle α of the tapered portion with respect to the axial direction was at 55 degrees, the axial length of the tapered portion was 0.11 mm, the radial direction height H of the protruding portion was 0.200 mm, and the radius R of the second curved portion was 0.12 mm.

On the other hand, the oil ring of the Comparative Example had no land formed in an end portion of an outer periphery of each rail portion, such that the end portion contacted with and slid on the inner surface of the cylinder C with a contact width of 0.2 mm.

Note that contact widths of the oil rings of the Examples 1 and 2 are uniquely determined in accordance with other dimensions illustrated in Table 1 and thus omitted in the description.

The oil rings of Examples 1 and 2 and Comparative Example were assumed to be mounted on the piston in the diesel engine, and the respective oil ring bodies were formed of steel in compliance with JIS SWRH77B and had nominal diameters of φ86. Also, for the respective oil rings of Examples 1 and 2 and Comparative Example, a combined tension between the oil ring body and the coil expander was set such that 2.0 MPa of a surface pressure was generated by the sliding surface.

The friction loss measurement was conducted using a floating-liner-type unitary ring reciprocating tester (bore diameter of 86 mm and stroke of 72 mm) to evaluate a friction mean effective pressure (FMEP). In this tester, peripheral surfaces of the oil rings of Examples 1 and 2 and Comparative Example slid on a cylinder liner formed of cast iron having surface roughness of 2 to 4 μm in ten-point average roughness (Rz).

The oil rings of the Examples 1 and 2 and the Comparative Example were sequentially mounted on a piston of this tester, and friction force applied to the cylinder liner by the oil ring during a reciprocating motion of the piston was measured using a load measuring sensor. During the measurement, the engine speed was at 1500 rpm, and a temperature of the oil supplied to the inner surface of the cylinder liner was at 25° C.

On the other hand, the oil consumption measurement was conducted using a natural-intake gasoline engine with four water-cooling cycles (four cylinders with 2000 cc engine displacement), and the oil rings of the Examples 1 and 2 and the Comparative Example were sequentially mounted on a piston of this engine. A test condition was as follows: the engine was run at a speed of 6500 rpm alternately repeating a WOT (Wide Open Throttle) driving and a pattern driving. The oil consumption was calculated from amounts of the oil measured prior to and after predetermined duration of engine running.

Table 1 illustrates the results of the friction loss measurement (friction mean effective pressure) and the oil consumption measurement. The results are represented by a ratio relative to the results of the Comparative Example set to 100.

variety of manners without departing from the spirit and the scope of the disclosure herein.

For example, although in the above embodiment the oil ring 1 of the disclosure is mounted on the piston of the diesel engine, the disclosure is also applicable to an oil ring mounted on a piston of a gasoline engine.

Also, the oil ring body 10 may be formed of a material other than steel.

REFERENCE SIGNS LIST 1 oil ring
10 oil ring body
10a opening
11 web portion
12 rail portion
13 oil passage hole
14 mounting groove
20 coil expander
30 land
31 upper axial portion
32 lower axial portion
33 tapered portion
34 protruding portion
34a peripheral surface
35 first curved portion
36 second curved portion
40 tapered surface
P piston
α angle
C cylinder
L axial length
R radius
H radial direction height

The invention claimed is:

1. An oil ring comprising an oil ring body, which is formed in a split ring shape having an opening, a web portion, and a pair of rail portions integrally formed with either axial end of the web portion, and also including a coil

TABLE 1

| | Contact Width (mm) | Radius R of First Curved Portion (mm) | Angle α of Tapered Portion (Degrees) | Axial Length L of Tapered Portion (mm) | Radial Direction Height H of Protruding Portion (mm) | Radius R of Second Curved Portion (mm) | FMEP: Friction Mean Effective Pressure | Initial Oil Consumption | Oil Consumption after 1000 hrs' Duration of Engine Running | Oil Consumption after 4000 hrs' Duration of Engine Running |
|---|---|---|---|---|---|---|---|---|---|---|
| | | | | | | | Relative to Comparative Example Set to 100 | | | |
| Comparative Example | 0.2 | 0 | 0 | 0 | 0 | 0 | 100 | 100 | 100 | 100 |
| Example 1 | — | 0.06 | 2 | 0.05 | 0.018 | 0.06 | 84 | 94 | 97 | 100 |
| Example 2 | — | 0.12 | 55 | 0.11 | 0.200 | 0.12 | 90 | 97 | 98 | 99 |

As can be seen in Table 1, the oil rings of the Examples 1 and 2 are capable of reducing frictional loss (friction mean effective pressure) and oil consumption more than the oil ring of the Comparative Example is capable of.

Also, as can be seen from a comparison between the Example 1 and the Example 2, an increase in the angle α with respect to the axial direction of the tapered portion along with an increase in the radial direction height H of the protruding portion enhances wear resistance of the protruding portion and reduces the oil consumption for a long period of time.

It is to be understood that the disclosure herein is not limited to the foregoing embodiment but may be varied in a expander, which is mounted on a radially inner side of the oil ring body to push the oil ring body radially outward, the oil ring, wherein each of the pair of rail portions has a land protruding radially outward from the rail portion and a tapered surface extending from an axial surface of the rail portion, which is facing in an axial direction of the rail portion, to the land with a diameter gradually increasing from the axial surface to the land, and the land includes a pair of axial portions facing opposite to each other in an axial direction, a tapered portion having one axial end contiguous to one of the axial portions via a first curved portion, and a protruding portion having one of axial ends contiguous to the tapered portion and the other axial end contiguous to the other axial portion via a second curved portion, the protruding portion protruding from the tapered portion in a direction perpendicular to the tapered portion.

2. The oil ring according to claim 1, wherein a peripheral surface of the protruding portion is formed in a semi-barrel shape.

3. The oil ring according to claim 1, wherein a peripheral surface of the protruding portion is formed in a cylindrical shape in parallel with the axial direction.

4. The oil ring according to claim 1, wherein a radial direction height of the protruding portion from a connection portion between the protruding portion and the tapered portion is at least 0.018 mm.

5. The oil ring according to claim 1, wherein the tapered portion has a conical surface inclined at an angle of 55 degrees or less with respect to the axial direction.

6. The oil ring according to claim 1, wherein both a radius of the first curved portion and a radius of a second curved portion are 0.12 mm or less.

7. The oil ring according to claim 1, wherein an axial length of the tapered portion is at least 0.05 mm.

* * * * *